(12) United States Patent
Lolio, Jr.

(10) Patent No.: US 9,890,536 B2
(45) Date of Patent: Feb. 13, 2018

(54) SILICONE RUBBER UNIVERSAL FIT FLEXIBLE TREE TRUNK GUARD

(71) Applicant: Thomas W. Lolio, Jr., Sevierville, TN (US)

(72) Inventor: Thomas W. Lolio, Jr., Sevierville, TN (US)

(*) Notice: Subject to any disclaimer, the term of this patent is extended or adjusted under 35 U.S.C. 154(b) by 159 days.

(21) Appl. No.: 15/054,225

(22) Filed: Feb. 26, 2016

(65) Prior Publication Data

US 2016/0278306 A1    Sep. 29, 2016

Related U.S. Application Data

(60) Provisional application No. 62/139,363, filed on Mar. 27, 2015.

(51) Int. Cl.
| | | |
|---|---|---|
| *A01G 13/00* | (2006.01) | |
| *E04D 13/08* | (2006.01) | |
| *E04D 13/064* | (2006.01) | |
| *E02D 31/06* | (2006.01) | |
| *A01G 13/02* | (2006.01) | |

(52) U.S. Cl.
CPC ......... *E04D 13/08* (2013.01); *A01G 13/0237* (2013.01); *E02D 31/06* (2013.01); *E04D 13/0645* (2013.01); *E04D 2013/0813* (2013.01); *E04D 2013/0833* (2013.01); *E04D 2013/0846* (2013.01)

(58) Field of Classification Search
CPC ............... A01G 13/02; A01G 13/0237; A01G 13/0281; A01G 13/04; A01G 13/043

USPC ................................................ 47/32.4, 32.5
See application file for complete search history.

(56) References Cited

U.S. PATENT DOCUMENTS

| 203,898 | A | * | 5/1878 | Doak ................. | A01G 13/0243 |
| | | | | | 43/132.1 |
| 1,442,367 | A | * | 1/1923 | Stevens ............. | A01G 13/0237 |
| | | | | | 47/1.01 R |
| 1,875,533 | A | * | 9/1932 | Weaver ............. | A01G 13/0243 |
| | | | | | 47/32.4 |
| 1,879,813 | A | * | 9/1932 | Molitor ............. | A01G 13/0243 |
| | | | | | 47/32.4 |

(Continued)

FOREIGN PATENT DOCUMENTS

| DE | 102006034208 B3 | * | 10/2007 | ......... A01G 13/0237 |
| EP | 0704584 A1 | * | 4/1996 | ......... A01G 13/0237 |

*Primary Examiner* — Monica L Williams
*Assistant Examiner* — Aaron M Rodziwicz
(74) *Attorney, Agent, or Firm* — Pitts & Lake, P.C.

(57) ABSTRACT

A universal fit flexible tree trunk guard fabricated from a medium to high density silicone rubber material for protecting the trunk of a tree or an ornamental shrub from strikes from lawn care equipment or from interactions with wildlife. A plurality of hole members are provided along the upper and lower edges of the trunk guard. This rectangular sheet can then be wrapped around the trunk, the diameter of the thus-formed cylinder adjusted to fit the tree or ornamental shrub to be protected. Mechanical fastening means can then be used, at registering hole members, to secure the trunk guard in a cylindrical form. Additionally, the interior surface, i.e. the surface that is facing the trunk of the tree or ornamental shrub, can be provided with a plurality of spaced bosses that maintain an air space between the surface of the tree trunk and the trunk guard.

19 Claims, 6 Drawing Sheets

(56) References Cited

U.S. PATENT DOCUMENTS

| | | | | |
|---|---|---|---|---|
| 2,028,060 A * | 1/1936 | Gilbert | A01G 13/10 | 114/219 |
| 3,333,361 A * | 8/1967 | Manak | A01G 13/10 | 47/32.5 |
| 3,531,900 A * | 10/1970 | Vaughn | A01G 13/10 | 428/907 |
| 3,571,972 A * | 3/1971 | Carter, Jr. | A01G 13/0281 | 47/30 |
| 3,826,040 A * | 7/1974 | Roberts | A01G 13/0243 | 428/36.9 |
| 4,341,039 A * | 7/1982 | Reese | A01G 13/0237 | 47/2 |
| 4,400,909 A * | 8/1983 | Reese | A01G 13/0237 | 239/55 |
| 4,584,789 A * | 4/1986 | Jean | A01G 13/0237 | 47/23.1 |
| 4,665,645 A * | 5/1987 | Schau, III | A01G 9/00 | 47/32.7 |
| 4,700,507 A * | 10/1987 | Allen | A01G 13/0237 | 47/32.4 |
| 4,845,889 A * | 7/1989 | Taylor | A01G 13/0237 | 47/32.4 |
| 4,932,157 A * | 6/1990 | Shimp | A01G 13/0237 | 47/32 |
| 5,035,078 A * | 7/1991 | Kipnees | A01G 13/0237 | 47/29.1 |
| 5,048,229 A * | 9/1991 | Campbell | A01G 13/0237 | 47/32.4 |
| 5,060,416 A * | 10/1991 | Rohde | A01G 13/10 | 138/162 |
| 5,142,817 A * | 9/1992 | Rolf | A01G 13/0237 | 47/32.5 |
| 5,224,967 A * | 7/1993 | Rolf | A01G 7/06 | 47/32.5 |
| 5,323,566 A * | 6/1994 | Mills | A01G 13/0243 | 47/30 |
| 5,479,741 A * | 1/1996 | Underwood | A01G 13/0237 | 24/20 EE |
| 5,503,371 A * | 4/1996 | Bies | E04H 12/2292 | 256/1 |
| 5,661,925 A * | 9/1997 | MacMaster | A01G 13/0237 | 47/32.4 |
| 5,670,229 A * | 9/1997 | Lynch | B32B 25/04 | 428/52 |
| 5,782,041 A * | 7/1998 | Filipescu | A01G 13/10 | 52/101 |
| 6,024,048 A * | 2/2000 | Potente | A01K 39/0113 | 119/52.3 |
| 6,108,970 A * | 8/2000 | Ball | A01G 13/0243 | 47/48.5 |
| 6,357,172 B1 * | 3/2002 | Risgaard | A01G 13/0243 | 47/32.4 |
| 6,553,726 B1 * | 4/2003 | Roberts | A01G 13/105 | 47/32.5 |
| 8,181,386 B1 * | 5/2012 | Riley, Jr. | A01G 13/0243 | 47/29.1 |
| 8,256,184 B2 * | 9/2012 | Lowe | E04H 12/2292 | 52/170 |
| D796,279 S * | 9/2017 | Barina | D8/1 | |
| 2003/0140554 A1 * | 7/2003 | Whitcomb | A01G 13/0237 | 47/32.4 |
| 2005/0172549 A1 * | 8/2005 | Allen | A01G 13/0237 | 47/32.4 |
| 2009/0235581 A1 * | 9/2009 | Bevins | A01G 13/00 | 47/32.5 |
| 2015/0181815 A1 * | 7/2015 | Saunders | A01G 13/10 | 47/32.5 |

* cited by examiner

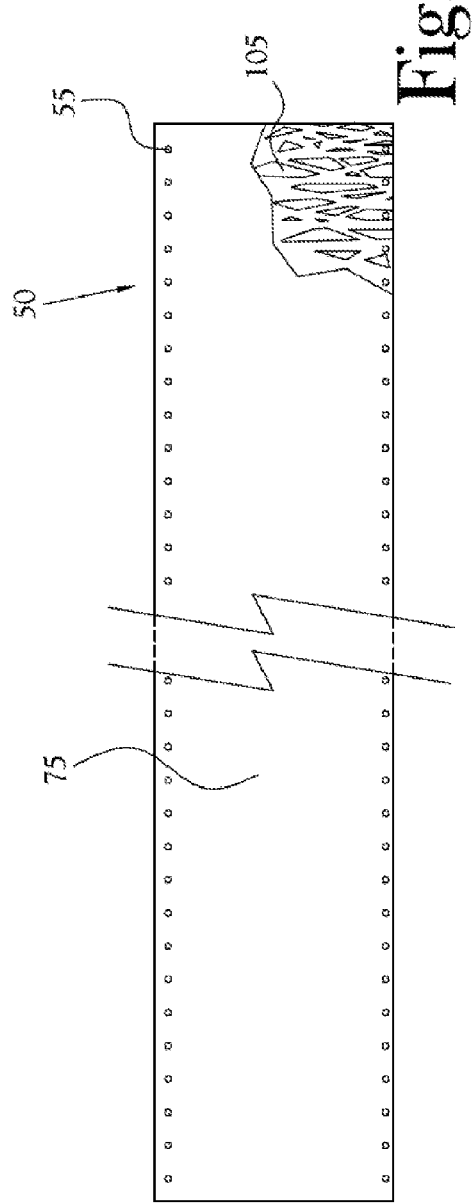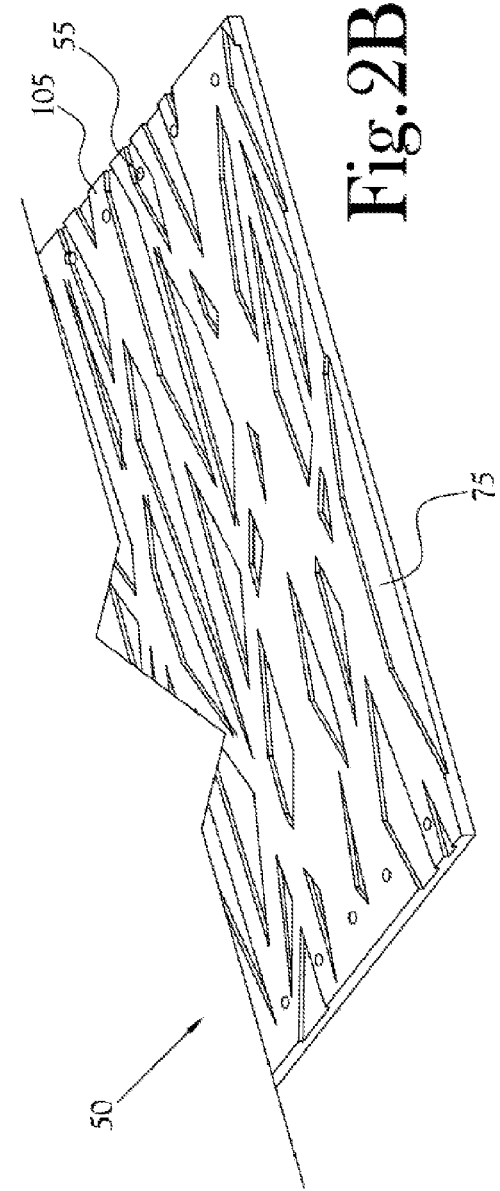

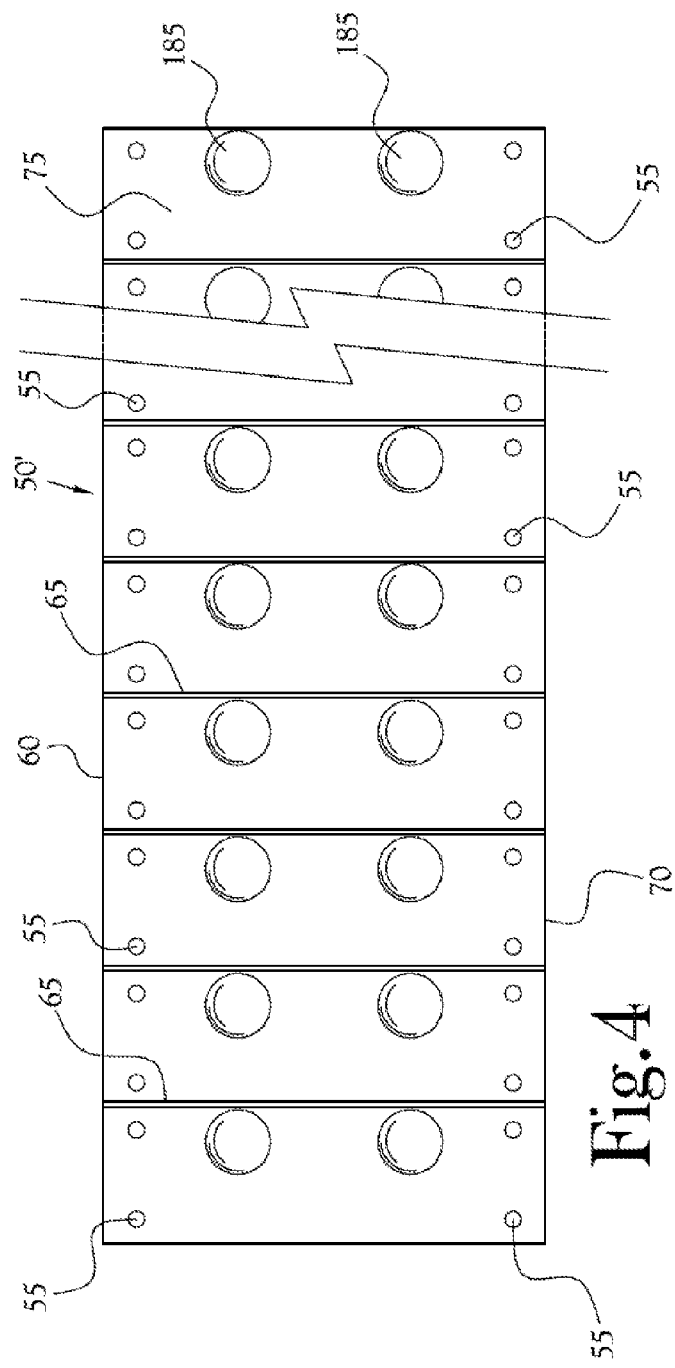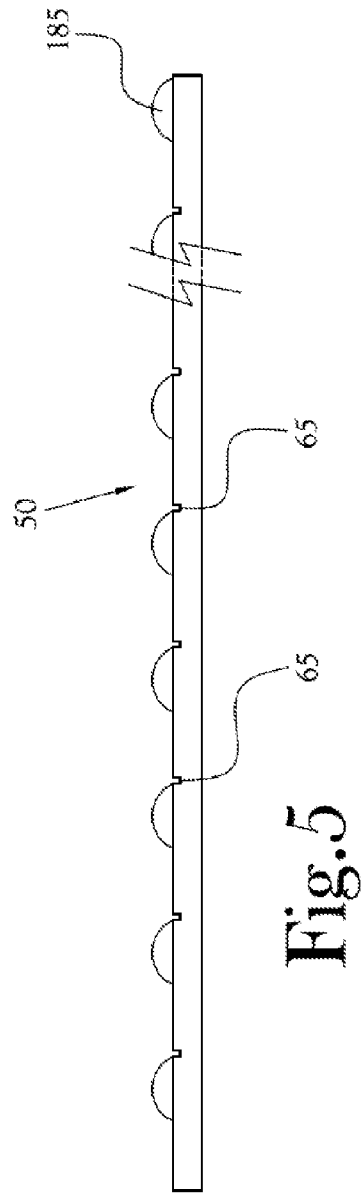

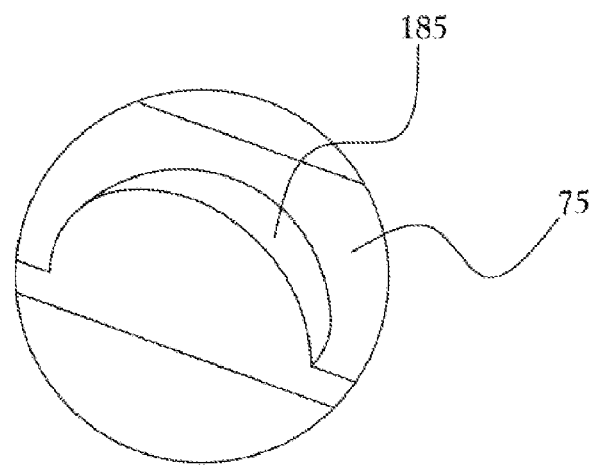
Fig.9A
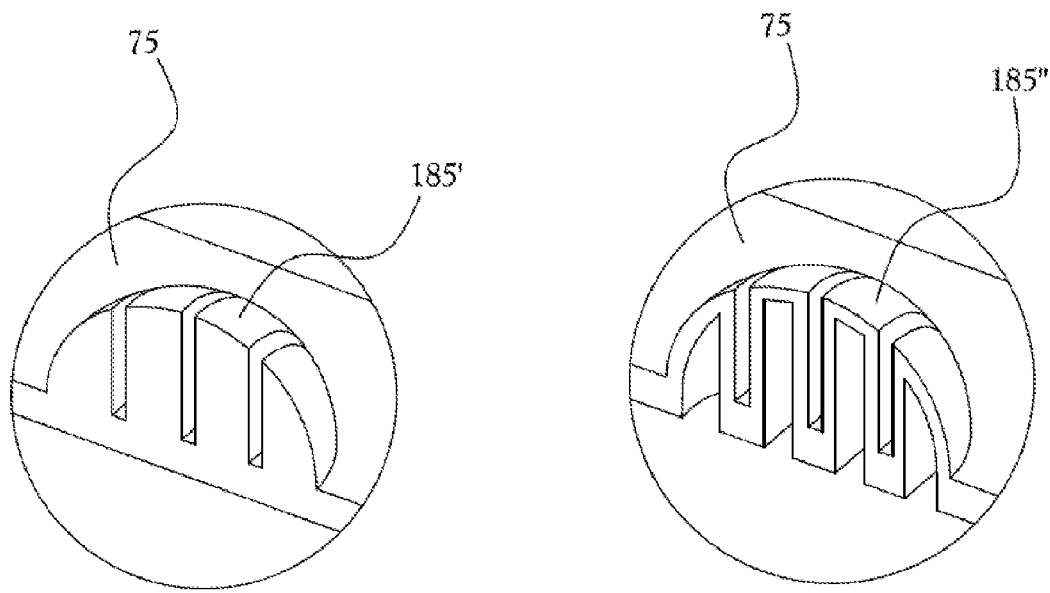
Fig.9B
Fig.9C

SILICONE RUBBER UNIVERSAL FIT FLEXIBLE TREE TRUNK GUARD

CROSS-REFERENCE TO RELATED APPLICATIONS

This application claims the benefit of U.S. Provisional Patent Application No. 62/139,363, filed on Mar. 27, 2015, which is incorporated herein in its entirety by reference.

STATEMENT REGARDING FEDERALLY SPONSORED RESEARCH OR DEVELOPMENT

Not Applicable

BACKGROUND OF THE INVENTION

1. Field of Invention

The invention relates to lawn accessories extruded from a dense silicone rubber. More particularly, the invention relates to a silicone rubber, universal fit flexible cylindrical guard for protecting the trunks of trees and ornamental shrubs from wildlife and from being struck by lawn care equipment.

2. Description of the Related Art

It is known, in the landscaping arts, to decorate lawns and gardens with trees and ornamental shrubs. These trees and ornamental shrubs are, frequently, susceptible to being cut or damaged by impact with lawn care equipment, including state-of-the-art filament line weed-trimming equipment. And, it is desirable to protect the trunks of trees and ornamental shrubs from inadvertent strikes from this type of lawn care equipment and from damage that can be inflicted by various types of rodents, including mice, squirrels and beaver, and other wildlife such as rabbits and deer. While there are plastic guards that are available in this art for protecting the trunks of trees and ornamental shrubs, these devices are often produced from plastic materials that are susceptible to being shattered, broken, or cut by impact with lawn care equipment and that are also susceptible to becoming brittle upon exposure to sub-freezing temperatures creating an appreciable risk of shattering upon impact by lawn care equipment or large animals.

What is missing in the art is a universal fit flexible cylindrical guard for the trunk of a tree or an ornamental shrub that is made of a dense silicone rubber material that resists being cut by filament line weed trimmers, that is resistant to becoming brittle in sub-freezing temperatures and that can be simply extruded into a desired shape.

BRIEF SUMMARY OF THE INVENTION

The universal fit flexible tree trunk guard of the present invention is constructed of a medium to high density silicone rubber. The universal fit flexible tree trunk guard of the present invention protects the trunks of trees and ornamental shrubs from strikes from lawn care equipment or from harmful interactions with rodents, including mice, squirrels, and beaver, and other wildlife such as rabbits, and deer. The medium to high density silicone rubber material is extruded, or compression molded, into a rectangular sheet. This silicone rubber material has sufficient density to maintain a selected shape, and has a sufficient density to resist abrasion or cutting by filament line weed trimmers and does not become brittle when exposed to sub-freezing temperatures. A plurality of hole members can be provided, at selective spacing, along the upper and lower edges of the substantially planer rectangular body of the trunk guard. This rectangular sheet can then be wrapped around the trunk, and the diameter of the thus-formed cylinder adjusted to fit the tree or ornamental shrub to be protected. Mechanical fastening means, such as plastic snap rivets or snap members, can then be used, at registering hole members, to secure the trunk guard in a cylindrical form. The trunk guard can be extruded in selected sizes depending upon the height of protection desired. For example, if one desired to provide protection from larger varieties of wildlife, such as deer, scraping a tree trunk, different height material would be utilized. Additionally, in an exemplary embodiment, the interior surface, i.e. the surface that is facing the trunk of the tree or ornamental shrub, can be provided with a plurality of spaced, convex projections, referred to herein as bosses, that maintain an air space between the surface of the tree trunk and the trunk guard that allows for water and air flow between the trunk guard and the surface of tree.

BRIEF DESCRIPTION OF THE SEVERAL VIEWS OF THE DRAWINGS

The above-mentioned features of the invention will become more clearly understood from the following detailed description of the invention read together with the drawings in which:

FIG. 2A is a plan view of the outer face of the silicone rubber universal fit flexible tree trunk guard illustrated in FIG. 1;

FIG. 2B is a perspective view of the outer face of one end of the silicone rubber universal fit flexible tree trunk guard illustrated in FIG. 1;

FIG. 4 is a top plan view of the inner face of a further embodiment of the silicone rubber universal fit flexible tree trunk guard of the present invention;

FIG. 5 is a side elevation view of an exemplary embodiment tree trunk guard of the present general inventive concept;

FIGS. 9A, 9B, and 9C are perspective views of alternate embodiment bosses disposed on the inner face of the tree trunk guard of the present invention.

DETAILED DESCRIPTION OF THE INVENTION

Figure 1:
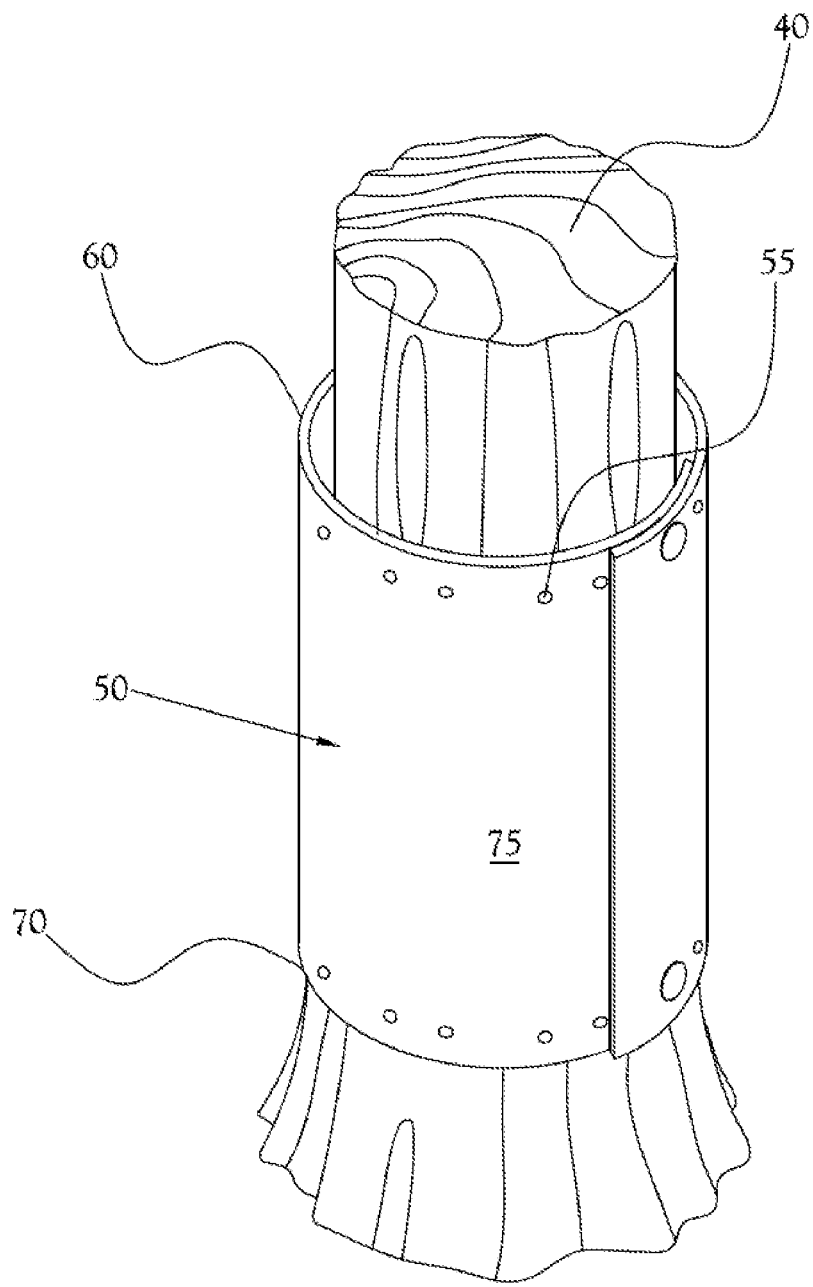
FIG. 1 is a perspective view of the silicone rubber universal fit flexible tree trunk guard of the present invention wrapped around the trunk of an exemplary tree.

FIGS. 1 and 2 illustrate an exemplary embodiment of a universal fit flexible tree trunk guard 50 of the present invention which, in an exemplary embodiment, is constructed of a medium to high density silicone rubber that is extruded, or compression molded, into a substantially planar, rectangular sheet of a selected length. The universal fit flexible tree trunk guard 50 is particularly adapted for protecting the trunks of trees and ornamental shrubs from strikes from lawn care equipment or from harmful interaction with rodents, including mice, squirrels and beaver, and other wildlife such as rabbits, and deer. As used herein, the term "trunk" should be interpreted to include the trunks of trees and of ornamental shrubs. Trunk guard 50 includes a substantially planar rectangular body member 75 fabricated from medium to high density silicone rubber. This high density silicone rubber material is resistant to becoming brittle in sub-freezing temperatures and is highly resistant to being cut by state-of-the-art filament-type weed trimmers.

Figure 3:
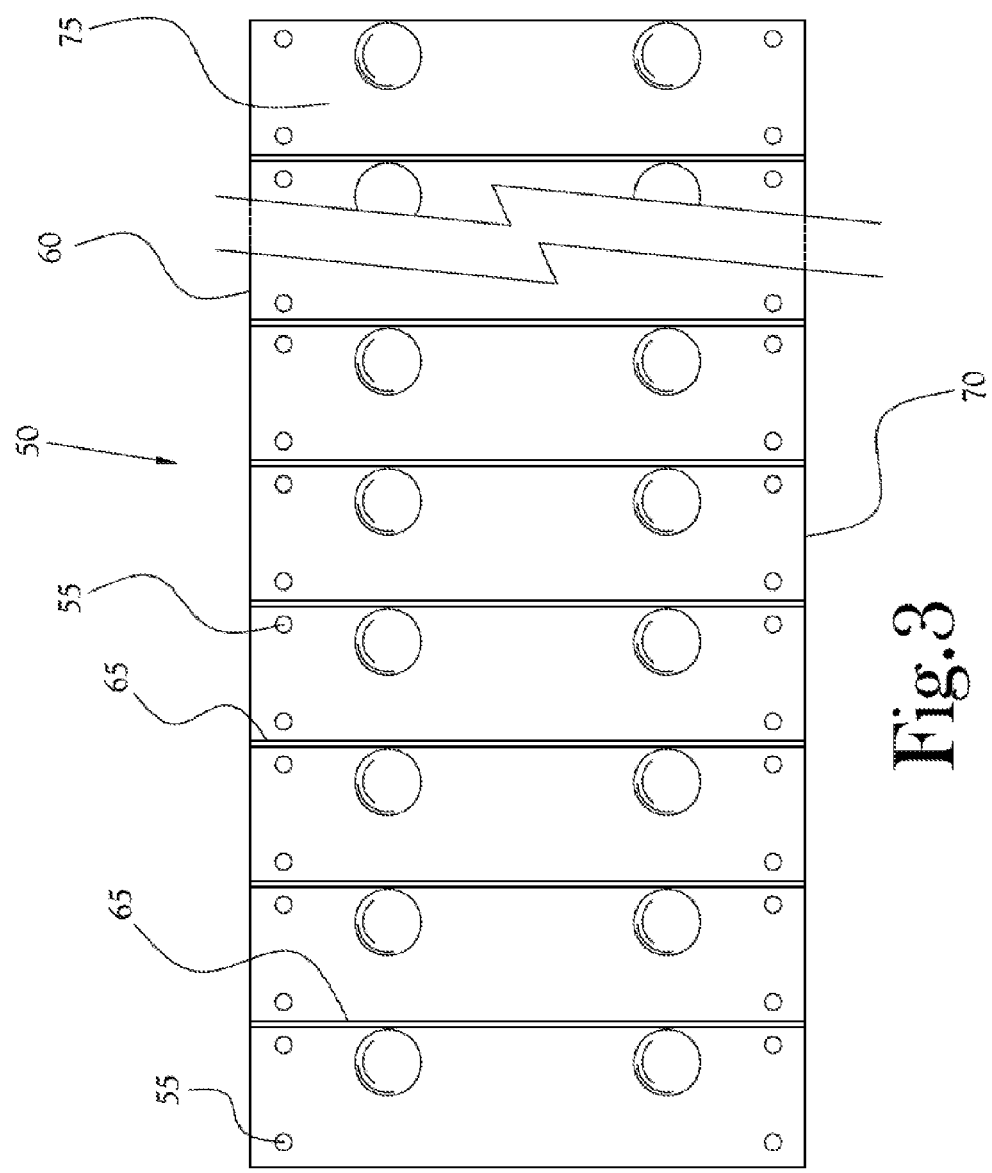
FIG. 3 is a top plan view of the inner face of one embodiment of the silicone rubber universal fit flexible tree trunk guard of the present invention.
Figure 6:
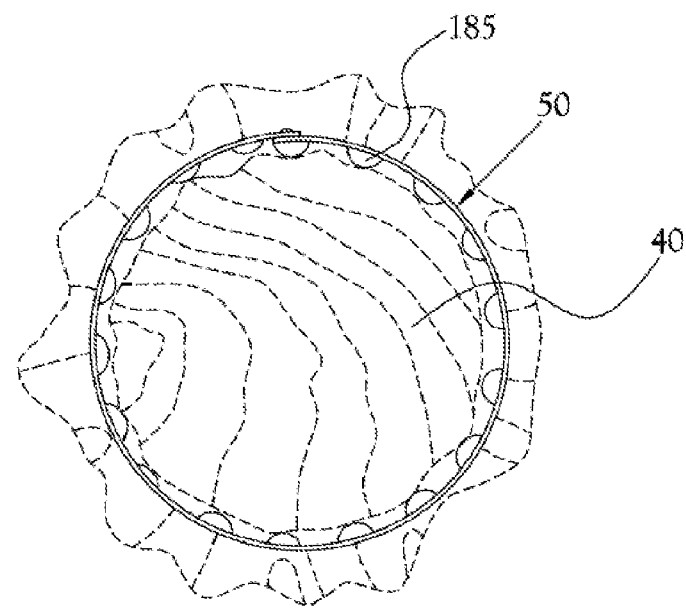
FIG. 6 is a top plan view of the silicone rubber universal fit flexible tree trunk guard of the present invention wrapped around the trunk of an exemplary tree.

The substantially planar rectangular body member 75 has an upper edge 60 and a lower edge 70. A plurality of hole members 55 are provided, at selective spacing, along the upper edge 60 and lower edge 70 of trunk guard 50. In an exemplary embodiment, hole members 55 are provided at approximately 2" spacing. The substantially planar rectangular body member 75 of trunk guard 50 can then be wrapped around the trunk as illustrated in FIG. 1. The plurality of hole members 55 allow the diameter of the thus-formed cylinder to be adjusted to fit the tree or ornamental shrub to be protected. Mechanical fastening members, as described in greater detail below, can then be used, at registering hole members 55, at the upper edge 60 and the lower edge 70 to secure the trunk guard 50 in a cylindrical form. Additionally, in an exemplary embodiment, the interior surface of trunk guard 50, i.e. the surface that is facing the trunk of the tree or ornamental shrub when in use, is provided with a plurality of spaced, convex projections, referred to herein as bosses 185, that maintain an air space between the surface of the tree trunk and the trunk guard 50 as best illustrated in FIG. 6. This airspace provides for water and air flow between trunk guard 50 and the surface of tree. In exemplary embodiments, as best illustrated in FIGS. 3 and 4, at least two rows of regularly spaced bosses 185 are provided. However, it will be appreciated by those skilled in the art that more than two rows of bosses 185 can be provided; and the bosses 185 can be positioned in many different patterns on the interior surface of trunk guard 50. Further, as illustrated in FIGS. 9A, 9B, and 9C, these bosses could be molded in various shapes, for instance boss 185, in FIG. 9A could be molded as a solid boss member; boss 185', in FIG. 9B, could be molded with grooves disposed therein, or boss 185", in FIG. 9C, could be molded in an accordion style that allows somewhat more compressibility, if desired, in the boss member than allowed by a solid boss member such as boss 185.

It will be appreciated that the trunk guard 50 can be extruded in selected sizes depending upon the height of protection desired. In one exemplary embodiment, illustrated in FIG. 3, the height of the trunk guard 50 is approximately 8". In a further exemplary embodiment, illustrated in FIG. 4, the height of the trunk guard 50' is approximately 6". It will also be appreciated that to provide protection against larger wildlife, such as deer, scraping a tree trunk, different height material would be utilized to fabricate trunk guard. The trunk guard 50 can be extruded to any selected length. It will be appreciated that the dimensions provided herein, both in terms of length and width, are exemplary embodiments; and the trunk guard of the present invention may be provided in other lengths and/or widths. It will be appreciated by those skilled in the art that, for most trees and ornamental shrubs in residential lawns, lengths of approximately 3 feet will be preferred. In cases where a greater length is needed, two trunk guards 50 can be secured to one another, end to end, to create a trunk guard of greater length. Alternatively, the trunk guard 50 could be extruded, or compression molded, in bulk lengths. This bulk length would allow a homeowner or landscaper to cut trunk guard 50 to the desired length in order to optimize material usage. To this end, and to assist the user to trim the trunk guard 50 to the desired length, a plurality of creases, or cut guides 65 which extend from upper edge 60 to lower edge 70 could be molded into the trunk guard 50 throughout its length.

Further, while the applicant herein makes no claim to the specific color of the universal fit flexible tree trunk guards described herein, it will be appreciated by those skilled in the art that the trunk guards 50 can be extruded or compression molded in a number of different colors to blend into its surroundings or to compliment the aesthetic tastes of a homeowner. Further, in an exemplary embodiment, the outer surface of the trunk guard 50 could have a matte surface or could have a textured surface with a texture 105 as illustrated in FIGS. 2A and 2B.

Figure 7:
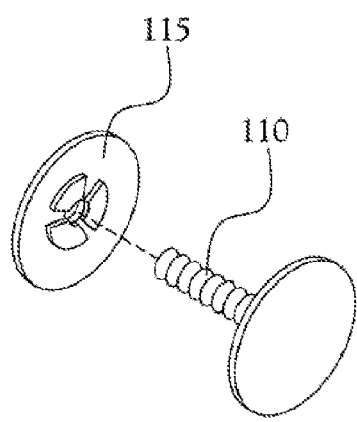
FIG. 7 is a perspective view of an exemplary embodiment of a mechanical fastener adapted to be used in conjunction with the silicone rubber universal fit flexible tree trunk guard of the present invention.
Figure 8:
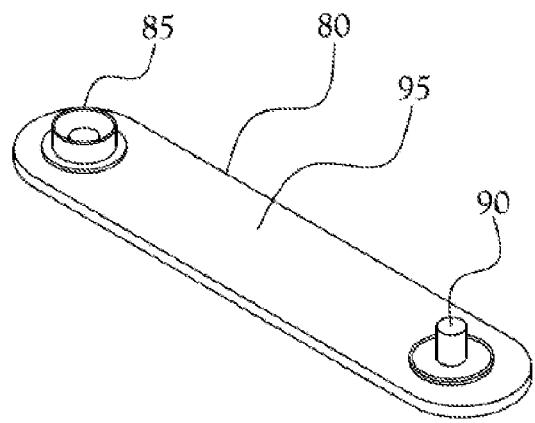
FIG. 8 is a plan view of a further embodiment of a mechanical fastener adapted to be used in conjunction with the silicone rubber universal fit flexible tree trunk guard of the present invention.

Referring to FIGS. 7 and 8, in an exemplary embodiment, the trunk guard 50 is secured, once adjusted to the desired diameter with a mechanical fastening means. In this regard, as illustrated in FIG. 7, this mechanical fastening means could be a snap rivet 110 and its associated snap rivet washer 105, the use of which should be readily recognized by those skilled in the art. Alternatively, a snap assembly 80, illustrated in FIG. 8, having a male snap component 90 and a female snap component 85 carried by a strap member 95 could be utilized. It will be recognized that the snap assembly 80, either in its entirety or various components thereof, could be molded of a similar silicone rubber material, or could be fashioned from any corrosion resistant material. And, those skilled in the art will recognize that other securement members could be utilized to secure the trunk guard at the selected size. For instance, zip ties (not illustrated) could be utilized, as well as threaded rivet members, or other types of rivet members (not illustrated).

While the present invention has been illustrated by description of several embodiments and while the illustrative embodiments have been described in detail, it is not the intention of the applicant to restrict or in any way limit the scope of the appended claims to such detail. Additional modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant's general inventive concept.

Having thus described the aforementioned invention, what is claimed is:

1. A universal fit flexible tree trunk guard adapted for protecting a trunk of a tree or an ornamental shrub from strikes from lawn care equipment and from interactions with wildlife, said universal fit flexible tree trunk guard comprising:

a substantially planar rectangular body member having an upper edge and a lower edge, wherein said substantially planar rectangular body member is fabricated from at least medium density silicone rubber, said substantially planar rectangular body member being adapted for being wrapped around a trunk;

a plurality of convex boss members disposed on an interior surface of said substantially planar rectangular body member;

a plurality of spaced hole members disposed along said upper edge;

a plurality of spaced hole members disposed along said lower edge, wherein upon wrapping said substantially planar rectangular body member around the trunk, a cylinder is formed, and further wherein, said plurality of hole members disposed on said upper edge and said plurality of hole members disposed on said lower edge allow a diameter of the thus-formed cylinder to be adjusted to fit the trunk to be protected; and a mechanical fastening means for securing aligned hole members at said upper edge and a mechanical fastening means for securing aligned hole members at said lower edge, wherein said substantially planar rectangular body member is secured in said cylindrical form.

2. The universal fit flexible tree trunk guard of claim 1 wherein said substantially planar rectangular body member is formed from compression molded silicone rubber.

3. The universal fit flexible tree trunk guard of claim 1 wherein said substantially planar rectangular body member is formed from high density silicone rubber.

4. The universal fit flexible tree trunk guard of claim 1 wherein said mechanical fastening means is defined by a snap rivet and an associated snap rivet washer.

5. The universal fit flexible tree trunk guard of claim 1 wherein said mechanical fastening means is defined by a strap assembly having a male snap member disposed at a first end and a female snap member disposed at a second end.

6. The universal fit flexible tree trunk guard of claim 1 wherein said mechanical fastening means is selected from a group consisting of a snap rivet and an associated snap rivet washer and a strap member having a male snap member disposed at a first end and a female snap member disposed at a second end.

7. The universal fit flexible tree trunk guard of claim 1 wherein said plurality of convex boss members are disposed in at least two rows of said convex boss members on said interior surface of said substantially planar rectangular body member.

8. The universal fit flexible tree trunk guard of claim 1 wherein said universal fit flexible tree trunk guard further comprises a plurality of cut guides molded into said trunk guard.

9. A universal fit flexible tree trunk guard adapted for protecting a trunk of a tree or an ornamental shrub from strikes from lawn care equipment and from interactions with wildlife, said universal fit flexible tree trunk guard comprising:

a substantially planar rectangular body member having an upper edge and a lower edge, wherein said substantially planar rectangular body member is fabricated from at least medium density silicone rubber, said substantially planar rectangular body member being adapted for being wrapped around a trunk;

a plurality of convex boss members disposed on an interior surface of said substantially planar rectangular body member, wherein said plurality of convex boss members are disposed in at least two rows of said convex boss members on said interior surface of said substantially planar rectangular body member;

a plurality of cut guides molded into said trunk guard, wherein each said gut guide extends from said upper edge to said lower edge;

a plurality of spaced hole members disposed along said upper edge;

a plurality of spaced hole members disposed along said lower edge, wherein upon wrapping said substantially planar rectangular body member around the trunk, a cylinder is formed, and further wherein, said plurality of hole members disposed on said upper edge and said plurality of hole members disposed on said lower edge allow a diameter of the thus-formed cylinder to be adjusted to fit the trunk to be protected; and a mechanical fastening means for securing aligned hole members at said upper edge and a mechanical fastening means for securing aligned hole members at said lower edge, wherein said substantially planar rectangular body member is secured in said cylindrical form.

10. The universal fit flexible tree trunk guard of claim 9 wherein said substantially planar rectangular body member is formed from compression molded silicone rubber.

11. The universal fit flexible tree trunk guard of claim 9 wherein said substantially planar rectangular body member is formed from high density silicone rubber.

12. The universal fit flexible tree trunk guard of claim 9 wherein said mechanical fastening means is defined by a snap rivet and an associated snap rivet washer.

13. The universal fit flexible tree trunk guard of claim 9 wherein said mechanical fastening means is defined by a strap assembly having a male snap member disposed at a first end and a female snap member disposed at a second end.

14. The universal fit flexible tree trunk guard of claim 9 wherein said mechanical fastening means is selected from a group consisting of a snap rivet and an associated snap rivet washer and a strap member having a male snap member disposed at a first end and a female snap member disposed at a second end.

15. A universal fit flexible tree trunk guard adapted for protecting a trunk of a tree or an ornamental shrub from strikes from lawn care equipment and from interactions with wildlife, said universal fit flexible tree trunk guard comprising:

a substantially planar rectangular body member having an upper edge and a lower edge, wherein said substantially planar rectangular body member is fabricated from a high density silicone rubber, said substantially planar rectangular body member being adapted for being wrapped around a trunk;

a plurality of convex boss members disposed on an interior surface of said substantially planar rectangular body member, wherein said plurality of convex boss members are disposed in at least two rows of said convex boss members on said interior surface of said substantially planar rectangular body member;

a plurality of cut guides molded into said trunk guard, wherein each said gut guide extends from said upper edge to said lower edge;

a plurality of spaced hole members disposed along said upper edge;

a plurality of spaced hole members disposed along said lower edge, wherein upon wrapping said substantially planar rectangular body member around the trunk, a cylinder is formed, and further wherein, said plurality of hole members disposed on said upper edge and said plurality of hole members disposed on said lower edge allow a diameter of the thus-formed cylinder to be adjusted to fit the trunk to be protected; and a mechanical fastening means for securing aligned hole members at said upper edge and a mechanical fastening means for securing aligned hole members at said lower edge, wherein said substantially planar rectangular body member is secured in said cylindrical form.

16. The universal fit flexible tree trunk guard of claim 15 wherein said substantially planar rectangular body member is formed from compression molded silicone rubber.

17. The universal fit flexible tree trunk guard of claim 15 wherein said mechanical fastening means is defined by a snap rivet and an associated snap rivet washer.

18. The universal fit flexible tree trunk guard of claim 15 wherein said mechanical fastening means is defined by a strap assembly having a male snap member disposed at a first end and a female snap member disposed at a second end.

19. The universal fit flexible tree trunk guard of claim 15 wherein said mechanical fastening means is selected from a group consisting of a snap rivet and an associated snap rivet washer and a strap member having a male snap member disposed at a first end and a female snap member disposed at a second end.

* * * * *